(12) United States Patent
Anderson et al.

(10) Patent No.: US 6,384,388 B1
(45) Date of Patent: May 7, 2002

(54) METHOD OF ENHANCING THE BENDING PROCESS OF A STABILIZER BAR

(75) Inventors: Gerald D. Anderson, Oxford; John M. Khoury, Warren, both of MI (US); Michael W. Mattice, Cambridge; Thomas M. Drouillard, Wallaceburg, both of (CA); Kermit G. Rowe, III, Pembroke, KY (US); David Ian Fretwell, Rotherham; Alistair Bruce Christian Lovatt, Sheffield, both of (GB)

(73) Assignee: Meritor Suspension Systems Company, Troy, MI (US)

( * ) Notice: Subject to any disclaimer, the term of this patent is extended or adjusted under 35 U.S.C. 154(b) by 0 days.

(21) Appl. No.: 09/715,598

(22) Filed: Nov. 17, 2000

(51) Int. Cl.[7] .................................................. H05B 6/10
(52) U.S. Cl. ....................... 219/602; 219/635; 219/637; 219/61.2; 72/128; 148/567
(58) Field of Search ................................. 219/602, 607, 219/610, 635, 637, 643, 646, 61.2, 59.1; 72/128; 148/567, 572, 570

(56) References Cited

U.S. PATENT DOCUMENTS

| | | | | |
|---|---|---|---|---|
| 2,461,323 A | * | 2/1949 | Hille | 219/602 |
| 3,708,645 A | * | 1/1973 | Osbor, Jr. | 219/602 |
| 4,526,628 A | * | 7/1985 | Ohno et al. | 148/150 |
| 4,554,029 A | * | 11/1985 | Schoen et al. | 219/602 |
| 5,491,996 A | * | 2/1996 | Baarman et al. | 72/128 |
| 6,097,012 A | * | 8/2000 | Shiozuka | 219/602 |

FOREIGN PATENT DOCUMENTS

| | | | |
|---|---|---|---|
| DE | 195 49 218 | * | 11/1996 |
| JP | 61-64817 | * | 4/1986 |

* cited by examiner

Primary Examiner—Philip H. Leung
(74) Attorney, Agent, or Firm—Carlson, Gaskey & Olds

(57) ABSTRACT

A method of enhancing the bending process of a stabilizer bar by locally pre-heating the stabilizer bar immediately prior to formation. By pre-heating the stabilizer bar, the stress in the stabilizer bar is relieved at the bending areas. This allows larger bars to be formed which would otherwise be outside of machine parameters. In the disclosed embodiments, the stabilizer bar is locally heated by induction coils or resistance heating at the bend areas.

20 Claims, 2 Drawing Sheets

METHOD OF ENHANCING THE BENDING PROCESS OF A STABILIZER BAR

BACKGROUND OF THE INVENTION

The present invention relates generally to a method for enhancing the bending process of a stabilizer bar by pre-heating the stabilizer bar immediately prior to bending.

Vehicles are commonly equipped with suspension systems for absorbing road shock and other vibrations, while providing for a smooth and comfortable ride. A suspension component, such as a stabilizer bar, is often used to increase roll rigidity and to improve the steering stability of the vehicle.

Larger diameter stabilizer bars can only be formed in the "soft" state because of their size. A cold bending process is often used to form the bars, but there are limitations in the cold bending process with respect to bar diameter coupled with the hardness of the bar material. As the diameter of the bar increases, more force is needed to bend the bar. However, the bar may fall outside of machine parameters and be unable to be formed because of its size. After being cold formed, larger diameter bars must then be heat treated to relieve stress, which can also cause changes in the bar shape.

Hence, there is a, need in the art for a method for enhancing the bending process of a stabilizer bar by pre-heating the stabilizer bar immediately prior to the bending process.

SUMMARY OF THE INVENTION

This invention relates to a method for enhancing the bending process of a stabilizer bar by pre-heating the stabilizer bar at desired locations immediately prior to the bending process.

By pre-heating the stabilizer bar locally at the areas of the bar which are to be formed, the strength of the bar at the heated locations is relieved, facilitating bending and allowing bars of larger diameter, which would ordinarily be outside of machine parameters, to be formed.

In a first embodiment of the present invention, a stabilizer bar is pre-heated at localized areas by induction coils positioned to coincide with the areas that are to be formed. Immediately after heating, the stabilizer bar is removed from the induction coils by either mechanical handling or robotic techniques, and then placed directly in the bending machine for formation.

In another embodiment, standardized clamping electrode blocks arranged in pairs, both positive and negative, are adjustably positioned along the length of the bar. The blocks are positioned so that the parts of the bar between the electrodes are heated. After heating, the bar is fed out of the resistance heater and in the bending machine for formation.

Accordingly, the present invention provides a method for enhancing the cold bending process of a stabilizer bar by pre-heating the stabilizer bar immediately prior to bending.

These and other features of the present invention will be best understood from the following specification and drawings.

BRIEF DESCRIPTION OF THE DRAWINGS

The various features and advantages of the invention will become apparent to those skilled in the art form the following detailed description of the currently preferred embodiment. The drawings that accompany the detailed description can be briefly described as follows.

DETAILED DESCRIPTION OF THE PREFERRED EMBODIMENT

Figure 1A:
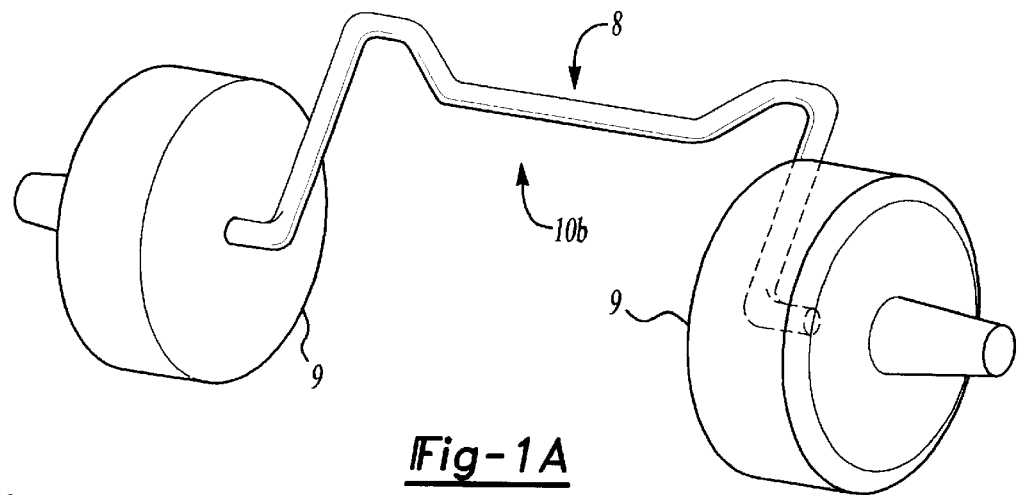
FIG. 1a illustrates a schematic view of a stabilizer bar mounted on a vehicle.
Figure 1B:
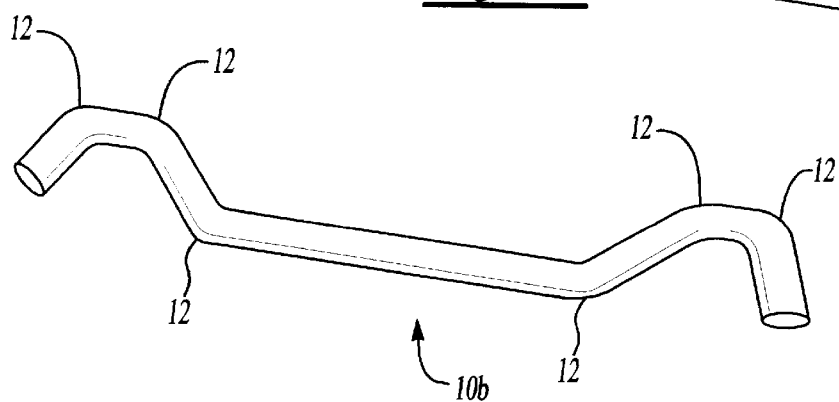
FIG. 1b illustrates a schematic view of a formed stabilizer bar.

FIG. 1a shows a bar 10b on a vehicle 8 mounted between wheels 9. As known, the bar 10b provides a stabilizer function. FIG. 1b illustrates a schematic view of a formed stabilizer bar 10b of a vehicle suspension system. Bends 12 are created by forming the stabilizer bar 10b in a bending machine. By pre-heating the stabilizer bar 10 immediately prior to bending, the working range of current bending machines can be extended. Bend areas 14 of the bar 10b are heated to a temperature less than the temperature required for warm bending. In the preferred embodiment, the bend areas 14 are heated to a temperature in the range of 400° to 700° C. Pre-heating reduces the strength of the bar 10b, facilitating bending at the desired locations. After pre-heating, the bar 10b is then placed directly in the bending machine by either mechanical or robotic techniques. The bar 10b is to be positioned within the bending machine and bent immediately to insure that the heated portions of the bar do not cool prior to bending.

Figure 2:
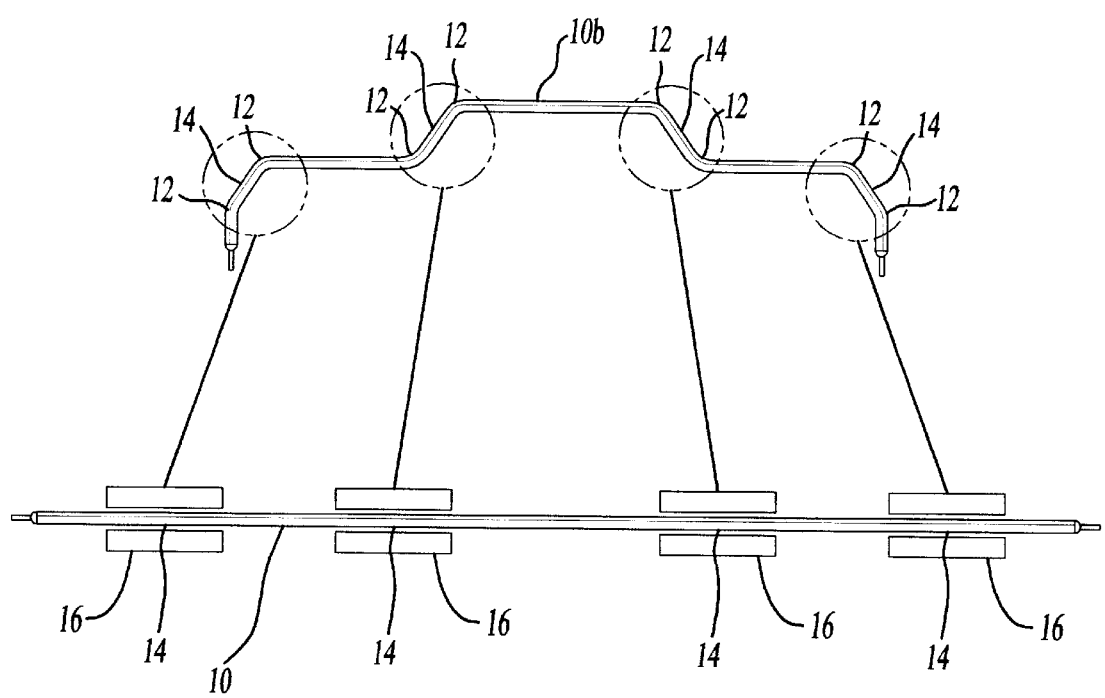
FIG. 2 illustrates a schematic view of an opened coil used to locally heat a stabilizer bar at bending areas.

FIG. 2 illustrates a first embodiment of the present invention. As shown in FIG. 2, an unformed stabilizer bar 10 is pre-heated at localized bend areas 14 by induction coils 16 placed along the length of the stabilizer bar 10 to coincide with the areas of the bar 10 that are to be bent. The stabilizer bar 10 is fed into and positioned within the induction coils 16 either by mechanical or robotic techniques. Once the stabilizer bar 10 is positioned so that the bend areas 14 are positioned inside the induction coils 16, the bend locations 14 are heated by the induction coils 16. Immediately after heating, the stabilizer bar 10 is removed from the induction coils 16 by mechanical or robotic techniques and placed directly in the bending machine. Once inside the bending machine, the bar 10 is formed at the heated bend areas 14 to create bends 12. The bending machine is known in the art.

Figure 3:
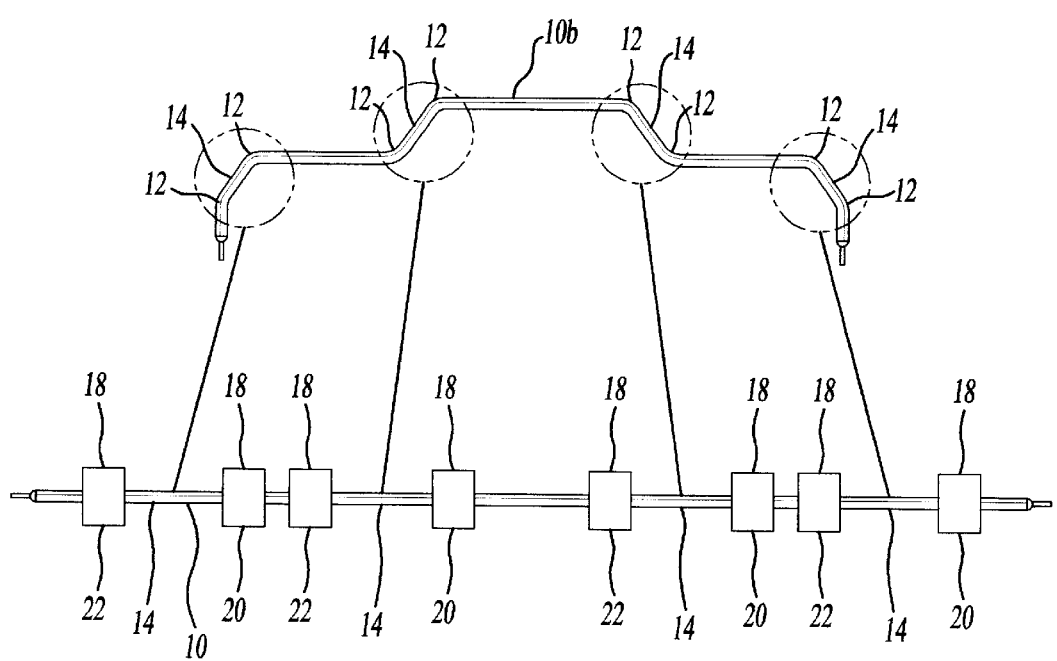
FIG. 3 illustrates a schematic view of a resistance method used to locally heat a stabilizer bar at bending areas.

FIG. 3 illustrates another embodiment of the present invention. A resistance heater formed from standardized clamping electrode blocks 18 arranged in pairs, both positive 20 and negative 22, is used to heat the stabilizer bar 10 at localized bend areas 14. The positive 20 and negative blocks 22 are positioned and clamped on the bar 10 such that the areas of the bar 10 between the electrodes 20, 22 are heated by current passing between the electrodes 20, 22. The bar 10 is fed out of the resistance heater either by either mechanical or robotic techniques and is subsequently formed in the bending machine at the bend areas 14 to create bends 12.

In each of the above embodiments, the stabilizer bar is pre-heated prior to bending in order to reduce strength in the bend areas of the bar. This facilitates bending and allows bars of larger diameter to be formed, which would otherwise be outside of machine parameters.

Accordingly, the present invention provides a method of enhancing the bending process of a stabilizer bar by pre-heating the bar immediately prior to bending.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. A method for forming a stabilizer bar of a vehicle suspension system comprising the steps of:
    simultaneously locally heating said stabilizer bar at a plurality of bending points without substantially heating said stabilizer bar outside of said plurality of bending points; and
    subsequently forming said stabilizer bar at each of said plurality of bending points to create a bend portion at each of said plurality of bending points.

2. The method as recited in claim 1 wherein the step of forming said stabilizer bar includes forming said stabilizer bar prior to a significant reduction in temperature of said stabilizer bar at said plurality of bending points.

3. The method as recited in claim 1 wherein the step of locally heating said stabilizer bar includes heating said plurality of bending points to an elevated temperature of 400° to 700° C.

4. The method as recited in claim 1 wherein the step of locally heating said stabilizer bar includes heating said stabilizer bar at said at plurality of bending points by a resistance heater.

5. The method as recited in claim 1 further comprising the step of subsequently transferring said stabilizer bar to a bending machine.

6. A method for forming a stabilizer bar of a vehicle suspension system comprising the steps of:
    simultaneously locally heating said stabilizer bar at a plurality of bending points by an induction coil member, said plurality of bending points positioned substantially within said induction coil member; and
    subsequently forming said stabilizer bar at each of said plurality of bending points to create a bend portion at each of said plurality of bending points.

7. A method for forming a stabilizer bar of a vehicle suspension system comprising the steps of:
    simultaneously locally heating said stabilizer bar at a plurality of bending points by a resistance heater including at least one pair of positive and negative electrodes, said pair of electrodes being positioned before and after each of said plurality of bending points, said positive and negative electrodes heating each of said plurality of bending points by passing current therebetween; and
    subsequently forming said stabilizer bar at each of said plurality of bending points to create a bend portion at each of said plurality of bending points.

8. A method for forming a stabilizer bar of a vehicle suspension system comprising the steps of:
    locally heating said stabilizer bar at a plurality of bending points without substantially heating said stabilizer bar outside of said plurality of bending points;
    subsequently transferring said stabilizer bar to a bending machine; and
    forming said stabilizer bar at each of said plurality of bending points to create a bend portion at each of said plurality of bending points.

9. The method as recited in claim 8 wherein the step of forming said stabilizer bar includes forming said stabilizer bar prior to a significant reduction in temperature of said stabilizer bar at said plurality of bending points.

10. The method as recited in claim 8 wherein the step of locally heating said stabilizer bar includes heating said plurality of bending points to an elevated temperature of 400° to 700° C.

11. The method as recited in claim 8 wherein the step of locally heating said stabilizer bar includes heating said stabilizer bar at said at plurality of bending points by a resistance heater.

12. The method as recited in claim 8 wherein the step of locally heating said stabilizer bar at each of said plurality of bending points includes simultaneously heating said plurality of bending points.

13. A method for forming a stabilizer bar of a vehicle suspension system comprising the steps of:
    locally heating said stabilizer bar at a plurality of bending points by an induction coil member, said plurality of bending points positioned substantially within said induction coil member;
    subsequently transferring said stabilizer bar to a bending machine; and
    forming said stabilizer bar at each of said plurality of bending points to create a bend portion at each of said plurality of bending points.

14. A method for forming a stabilizer bar of a vehicle suspension system comprising the steps of:
    locally heating said stabilizer bar at a plurality of bending points by a resistance heater including at least one pair of positive and negative electrodes, said pair of electrodes being positioned before and after each of said plurality of bending points, said positive and negative electrodes heating each of said plurality of bending points by passing current therebewteen;
    subsequently transferring said stabilizer bar to a bending machine; and
    forming said stabilizer bar at each of said plurality of bending points to create a bend portion at each of said plurality of bending points.

15. A method for forming a stabilizer bar of a vehicle suspension system comprising the steps of:
    simultaneously locally heating said stabilizer bar at a plurality of bending points without substantially heating said stabilizer bar outside of said plurality of bending points;
    subsequently transferring said stabilizer bar to a bending machine; and
    forming said stabilizer bar at each of said plurality of bending points to create a bend portion at each of said plurality of bending points.

16. The method as recited in claim 15 wherein the step of forming said stabilizer bar includes forming said stabilizer bar prior to a significant reduction in temperature of said stabilizer bar at said plurality of bending points.

17. The method as recited in claim 15 wherein the step of locally heating said stabilizer bar includes heating said plurality of bending points to an elevated temperature of 400° to 700° C.

18. The method as recited in claim 15 wherein the step of locally heating said stabilizer bar includes heating said stabilizer bar at said at plurality of bending points by a resistance heater.

19. A method for forming a stabilizer bar of a vehicle suspension system comprising the steps of:

simultaneously locally heating said stabilizer bar at a plurality of bending points by an induction coil member, said plurality of bending points positioned substantially within said induction coil member, subsequently transferring said stabilizer bar to a bending machine; and forming said stabilizer bar at each of said plurality of bending points to create a bend portion at each of said plurality of bending points.

20. A method for forming a stabilizer bar of a vehicle suspension system comprising the steps of:

simultaneously locally heating said stabilizer bar at a plurality of bending points by a resistance heater including at least one pair of positive and negative electrodes, said pair of electrodes being positioned before and after each of said plurality of bending points, said positive and negative electrodes heating each of said plurality of bending points by passing current therebewteen;

subsequently transferring said stabilizer bar to a bending machine; and forming said stabilizer bar at each of said plurality of bending points to create a bend portion at each of said plurality of bending points.

* * * * *

UNITED STATES PATENT AND TRADEMARK OFFICE
CERTIFICATE OF CORRECTION

PATENT NO. : 6,384,388 B1
DATED : May 7, 2002
INVENTOR(S) : Anderson et al.

It is certified that error appears in the above-identified patent and that said Letters Patent is hereby corrected as shown below:

Column 3,
Line 31, delete "at" between "said" and "plurality"

Column 4,
Line 11, delete "at" between "said" and "plurality"
Line 64, delete "at" between "said" and "plurality"

Signed and Sealed this

Twenty-fourth Day of December, 2002

JAMES E. ROGAN
*Director of the United States Patent and Trademark Office*